United States Patent Office 3,301,743
Patented Jan. 31, 1967

3,301,743
POLYHYDROXY POLYACRYLATE ESTERS OF EPOXIDIZED PHENOL-FORMALDEHYDE NOVOLAC RESINS AND LAMINATES THEREFROM
Frank Fekete, Monroeville, Patrick J. Keenan, Pittsburgh, and William J. Plant, Monroeville, Pa., assignors to H. H. Robertson Company, Pittsburgh, Pa., a corporation of Pennsylvania
No Drawing. Filed June 12, 1963, Ser. No. 287,206
15 Claims. (Cl. 161—194)

This invention concerns novel thermosetting resins, their preparation and use.

More particularly this invention concerns polyhydroxy polyacrylate esters of epoxidized phenol-formaldehyde novolac resins. According to the invention, these novel resins are obtained through reaction of an acrylic acid, such as methacrylic acid and acrylic acid, with the epoxidized phenol-formaldehyde novolac resins.

The present thermosetting resins are homopolymerizable in the presence of typical vinyl polymerization initiators such as the peroxy initiators, for example, benzoyl peroxide. The present thermosetting resins are miscible with a variety of ethylenically unsaturated monomers and are copolymerizable therewith, for example, styrene, vinyl toluene, divinyl benzene, acrylic acid, methacrylic acid, alkyl esters of acrylic and methacrylic acid, diallyl phthalate, trially cyanurate, ethylene glycol dimethylacrylate, trimethylol propane trimethylacrylate, and the like. The present thermosetting resins also are miscible with and copolymerizable with unsaturated polyester resins such as the reaction products of a glycol with an alpha-beta ethylenically unsaturated dicarboxylic acid or anhydride, for example fumaric and maleic acid esters of glycols.

The present thermosetting resins also are miscible with and copolymerizable with polyhydroxy diacrylate esters of acrylic acids and di-glycidyl ethers of Bisphenols, for example, the reaction product of methacrylic acid (two mols) and the diglycidyl ether of Bisphenol-A (one mol). These mixtures are especially interesting because of their remarkable heat distortion values and high temperature strength retention.

The present thermosetting resins can be used alone or in mixture with other ethylenically unsaturated polymerizable monomers or resins. These resins have unusual heat resistance, heat stability, high temperature strength and resistance to chemical reagents and solvents.

These resins alone and in mixtures are cured by addition polymerization and thus release no by-products in curing. The resins can be cured with familiar procedures of the unsaturated polyester resin arts, i.e., without toxic curing agents.

The principal object of the invention is to provide a novel polymerizable resin which is a polyhydroxy polyacrylate ester of an epoxidized phenol-formaldehyde novolac resin.

Other objects include:

Providing novel resinous compositions which include the present resins, wherein exceptional heat resistance and stability are presented;

Providing a method for preparing the present resins;

Providing fibrous filaments with a coating of the present resin and its mixtures for development of filament-wound and filamentary laminated articles with remarkable heat resistance;

Providing fibrous fabrics with a coating of the present resins for use in laminated articles;

Providing compositions of the present resins with unsaturated polyester resinous compositions;

Providing cured resinous articles with remarkable heat resistance properties.

*Epoxidized phenol-formaldehyde novolac resins*

The expoxidized phenol-formaldehyde novolac resins of this invention have the following general formula:

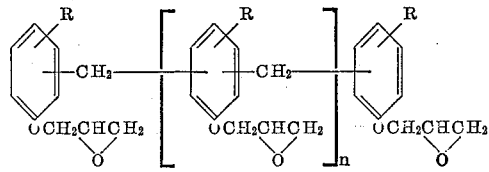

wherein R is a substituent selected from the class consisting of hydrogen and lower alkyl radicals having from one through four carbon atoms; and $n$ is an integer from zero to five. The resins are obtained through reaction of phenol or cresol with formaldehyde to an A-stage novolac resin. The novolac resin is epoxidized by reaction with epichlorohydrin through replacement of the phenolic hydrogen with an epoxy group. These resins are commercially available and have been described, for example, in U.S. Patent 3,050,414.

The phenol-formaldehyde novolac resins are formed by condensation of formaldehyde with a phenol having the formula

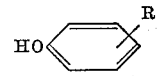

wherein R is a substituent selected from the class consisting of hydrogen and lower alkyl radicals having from one to four carbon atoms. The resulting phenol-formaldehyde novolac resin has a molecular weight from about 200 to about 1200. That novolac resin is thereafter epoxidized by replacing all or nearly all of the phenolic —OH radicals with the

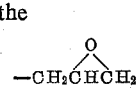

radical through expoxidation.

These epoxidized phenol-formaldehyde novolac resins are frequently characterized by their epoxy equivalent weight which is the weight of resin molecule divided by the number of epoxide groups in the resin. The value of $n$ in commercially available resins will very from an integer because of the presence of a spectrum of resin molecule sizes in commercial resins. The epoxy equivalent of such resins depends somewhat upon the value of $n$, upon the character of the R-substituent and upon the extent of the epoxidation of the resin. Incompletely epoxidized novolac resins possess a larger epoxy equivalent than the more completely epoxidized resins. Commercial resins are highly epoxidized since the presence of un-epoxidized phenolic hydroxyl radicals introduces instability into the resin through reaction between the epoxy groups and the phenolic hydroxy radicals during storage.

For the present purposes, a preferred epoxidized phenol-formaldehyde novolac resin is available from Dow Chemical Company under the trade name DEN–438.

This material is essentially a highly purified resin as set forth above wherein R represents hydrogen and $n$ has a value of about 1.6. The epoxide equivalent of the DEN–438 is 175–182. The epoxy functionality is 3.6.

This material was utilized as the epoxidized phenol-formaldehyde novolac resin in the examples described in this specification.

The epoxidized phenol-formaldehyde novolac resins are

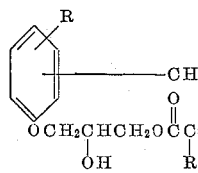

reacted with acrylic acids according to this invention whereby the

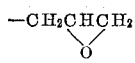

radicals are replaced by the hydroxy acrylic acid ester radical

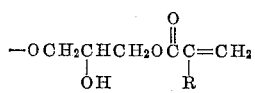

wherein R has the same significance as before.

Acrylic acids

The acrylic acids of this invention have the general formula

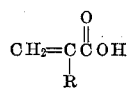

wherein R is a substituent selected from the class consisting of hydrogen and lower alkyl radicals having from one to four carbon atoms. Acrylic acid and methacrylic acid are preferred.

One mol of the acrylic acid is provided for each equivalent of the epoxidized phenol-formaldehyde novolac resin. Preferably the reactants are provided in substantially stoichiometric quantities to yield a substantially pure product. An excess of the acrylic acid frequently aids the stability of the product without interfering significantly with the properties of the product since the final resin is copolymerizable with the excess acrylic acid.

Preparation

The two ingredients are mixed, a catalyst is added and the mixture is heated to a suitable reaction temperature between room temperature and about 150° C. If desired a diluent may be provided in the reaction mixture. Non-reactive diluents may be employed such as toluene, xylene, and the like. Preferably a copolymerizable diluent such as ethylene glycol dimethacrylate, diallyl phthalate, and the like is selected as the diluent since the diluent may be utilized as the copolymerizable carrier after the completion of the resin formation reactions.

A tertiary amine catalyst may be employed. About one percent by weight of triethylamine is a suitable catalyst, although it is preferred to include a polymerization-inhibiting quantity of a vinyl polymerization inhibitor such as catechol, hydroquinone, and the like where an amine catalyst is used, i.e., about 600 parts per million by weight of the inhibitor.

A preferred catalyst is a mixture of 3 parts triphenyl stibine and one part triphenyl phosphine which requires no inhibitor and which achieves storage stability of the product resin. About 0.1 to 2 percent by weight of the mixture of stibine and phosphine is excellent. The ratio of stibine:phosphine may range from about 0.1:1 to 10:1.

The reaction mixture heating continues until the acid value of the mixture diminishes to a low level indicating substantially complete reaction between the two reactants, i.e., that the product is free of unreacted epoxide groups and carboxylic acid groups. The product resin is directly recovered as a polymerizable thermosetting resinous substance. Where, for example, the epoxidized phenol-formaldehyde novolac resin is reacted with an acrylic acid, and the resulting polymerizable thermosetting resin has the formula

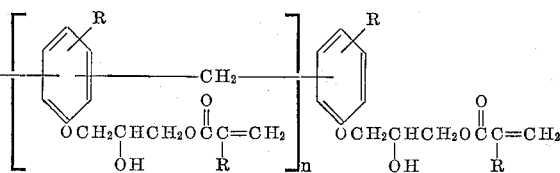

wherein R and $n$ have the values above listed.

For each mol of the epoxidized phenol-formaldehyde novolac resin there are $(n+2)$ mols of the acrylic acid. Alternatively, there is one mol of the acrylic acid for each epoxy equivalent of the epoxidized phenol-formaldehyde novolac resin.

Curing catalysts

The present resins are useful in mixtures with other ethylenically unsaturated polymerizable materials. Such compositions have been cured through peroxide catalysts from about 0.2 to about 2.0 percent of the weight of the resins. Many of the peroxide catalysts have been used with some success. Benzoyl peroxide and tertiary butyl perbenzoate are preferred catalysts. The catalyzed storage life of the present compositions with tertiary butyl perbenzoate is about 8 to 20 hours at ambient room temperature. The catalyzed storage life can be extended beyond seven days through the addition of 0.2 to 2.0 percent of a 6 percent cobalt naphthenate solution. The catalyzed storage life of these resins with benzoyl peroxide is from about seven minutes to about twelve hours depending largely upon the other polymerizable monomers in the composition. Other peroxide catalysts include tertiary butyl hydroperoxide, dicumyl peroxide and various commercially available trade-named peroxide curing catalysts.

The present resin compositions frequently are tacky upon initial cure. A postcure heat treatment of the products eliminates tackiness and is recommended. Where the desirable heat resistance properties of these resins is desired, the postcure heat treatment is especially recommended.

Prepreg applications

The present resins, dissolved in a non-reactive solvent such as toluene, may be utilized as a prepreg resin for coating of glass filaments and glass fabric and other filaments and fabrics for filament winding uses and for laminating uses. The present resin readily dries tack-free after flashing of the solvent to form a polymerizable impregnation or coating of the filaments and fabrics. The resulting dry fabrics possess satisfactory draping properties for molding uses. The coated filaments can be wound around an object or a mandrel and thereafter heat-cured to an integral unit wherein the filaments are retained by the cured resin. Filamentary banding tapes also can be impregnated with the present resins.

Examples

*Example 1.*—Six equivalents DEN–438 (1080 grams) were mixed with six equivalents methacrylic acid (516 grams). The catalyst was 1 percent by weight triethylamine (15.7 grams). 600 p.p.m. toluhydroquinone (094 gram) was included in the reaction mixture as a polymerization inhibitor. The mixture was heated at 100° C. for six hours until the acid value diminished to 14.6.

The product was homopolymerizable in the presence of a peroxide initiator of vinyl polymerization such as benzoyl peroxide.

The resin was diluted with various copolymerizable diluents at levels of ten percent, 25 percent and fifty percent. Each of the mixtures was copolymerizable in the presence of a peroxy initiator of vinyl polymerization to yield excellent castings.

The vicosity of these resin mixtures was measured as follows:

*Viscosity, centipoises*

| Diluent | 10 percent | 25 percent | 50 percent |
| --- | --- | --- | --- |
| Diallyl phthalate | 100,000 | 21,800 | 680 |
| Triallyl cyanurate | 100,000 | 43,000 | 7,850 |
| Methyl methacrylate | 100,000 | 2,040 | 25 |
| Styrene | 100,000 | 2,350 | 45 |
| Ethylene glycol dimethacrylate | 100,000 | 29,200 | 5,660 |

*Example 2.*—Two equivalents DEN-438 (360 grams) were mixed with two equivalents acrylic acid (144 grams) in the absence of diluent. The catalyst was a mixture of 0.75 weight percent triphenyl stibine (4.9 grams) and 0.25 weight percent triphenyl phosphoric (1.6 grams). The mixture was heated at 118° C. for four hours until the acid value diminished to 5.2. The viscosity of the product resin was 95,000 cps. The product was a pale yellow semi-solid substance at room temperature.

The resin was maintained at 70° C. to determine its stability under accelerated storage test conditions. The resin alone became gelled on the 22nd day of the test. In a solution with 20 percent styrene, the resin became gelled during the second day of the test.

*Example 3.*—2.14 equivalents DEN-438 (385.2 grams) were mixed with 2.14 equivalents acrylic acid (154 grams) in 20 percent by weight diallyl phthalate (135 grams) as a diluent. The catalyst was the same as in Example 2. The mixture was heated at 110° C. for seven hours until the acid value diminished to 1.6. The product resin solution in diallyl phthalate had a viscosity greater than 100,000 cps.

*Example 4.*—Two equivalents of DEN-438 (360 grams) were mixed with two equivalents acrylic acid (144 grams) in twenty weight percent ethylene-glycol-dimethacrylate (126 grams) as a diluent. The catalyst was the same as in Example 2. The mixture was heated at 110° C. for twelve hours until the acid value diminished to 5. Thereupon an additional 188.5 grams ethylene glycol dimethacrylate was added to the mixture.

The resin solution has a specific gravity 25° C./25° C. of 1.163. The viscosity (Brookfield, 77° F.) was 4500 centipoises.

In the absence of catalyst, the mixture had a storage life of 3 months at 77° F. and an accelerated storage life of 9 days at 158° F. The catalyzed storage life depends somewhat on the selected catalyst. Using 1 percent t-butyl perbenzoate and 0.5 percent of a 6% cobalt naphthenate solution, the mixture had a catalyzed storage life exceeding one month.

The mixture gel time at 250° is 1.25 minutes. The peak exotherm is 459° F. Barcol hardness is 60.

*Example 5.*—Two equivalents of DEN-438 (360 grams) were mixed with two equivalents acrylic acid (144 grams) in 20 weight percent trimethylolpropane trimethacrylate (126 grams) as a diluent. The reaction catalyst was the same as in Example 2. The mixture was heated in a flask at 110° C. for twelve hours until the acid value diminished to 3.0.

*Example 6.*—Thirteen equivalents of DEN-438 (2318 grams) and thirteen equivalents acrylic acid (936 grams) were mixed with one weight percent triethylamine (44.7 ml.) as catalyst and 600 parts per million toluhydroquinone (1.95 grams) as inhibitor. The mixture was diluted in twenty weight percent ethylene glycol dimethacrylate (8128 grams) as diluent.

The reaction mixture was heated with agitation to a top temperature of about 210° F. over a period of about four hours to a final acid value from 3 to 7. Thereafter the mixture was cooled to about 190° F. and stripped under vacuum for about 15 minutes. Additional ethylene glycol dimethacrylate was added to the product to duplicate the properties of the resin of Example 4.

*Curing properties and products*

The polymerizable resin of Example 2 was homopolymerized with 1 percent tert-butyl-perbenzoate and 0.5 percent of a 6% cobalt naphthenate solution. The homopolymerized casting developed a Barcol hardness of 50.

A solution of the resin of Example 3 containing 40 percent by weight of diallyl phthalate has a viscosity of 4500 cps. The mixture was copolymerized with 1 percent by weight tert-butyl perbenzoate and 0.5 percent of a 6% cobalt naphthenate solution. The resulting casting had a Barcol hardness of 60 and a flexural strength of 17,350 p.s.i. The heat distortion point of the casting was 210–235° C. After the casting had been post-cured at 200° C. for 4 weeks, the heat distortion temperature was 305–330° C.

Glass mat laminates were prepared from the resin of Example 4. The laminates were post-cured for one hour at 150° C., then for one hour at 200° C. and finally for one hour at 220° C. After post curing, the laminates were tested for flexural strength, compressive strength and tensile strength. Thereafter the laminates were maintained at 220° C. for seven days and the same properties were again measured to determine the retention of strengths.

| | After post Curing, p.s.i. | After seven-day Exposure at 220° C., p.s.i. | Percentage Retention of Strength |
| --- | --- | --- | --- |
| Flexural strength | 23,526 | 21,962 | 93.3 |
| Compressive strength | 26,798 | 23,532 | 87.8 |
| Tensile strength | 11,440 | 11,048 | 96.7 |

The same laminates were tested for dielectric strength and arc resistance after the described post-cure and after a seven-day exposure at 220° C.

| | After post Curing | After seven-day Exposure at 220° C. | Percentage Retention of Property |
| --- | --- | --- | --- |
| Dielectric Strength, volts per mil | 402 | 363 | 88 |
| Arc Resistance, seconds | 180 | 153 | 85 |

*Example 7.*—A premix laminating composition was prepared from the resin of Example 4 as follows:

| | Parts by weight |
| --- | --- |
| Resin of Example 4 | 30.0 |
| T-butyl perbenzoate, catalyst | 0.3 |
| Clay filler | 38.5 |
| Calcium carbonate filler | 15.0 |
| Asbestos filler | 50.0 |
| Zinc stearate | 0.7 |
| Chopped glass fibers | 10.0 |

The premix composition was formed into laminates which were cured in a molding press for 2.5 minutes at 250–260° F. The resulting laminates were post-cured for 1 hour at 150° C., for one hour at 175° C., for 1 hour at 200° C. and finally for one hour at 220° C. The laminates were tested for flexural strength, compressive strength, tensile strength, arc resistance and dielectric constant after the post curing and again after exposure to 220° C. for seven days to determine these properties and their retention.

| Property | After post Curing | After seven-day Exposure at 220° C. | Percentage Retention |
| --- | --- | --- | --- |
| Flexural strength, p.s.i. | 9,292 | 8,800 | 95 |
| Compressive strength, p.s.i. | 25,553 | 24,786 | 97 |
| Tensile strength, p.s.i. | 4,125 | 3,649 | 88.5 |
| Dielectric Constant volts per mil. | 431 | 398 | 92.4 |
| Arc Resistance, seconds | 192 | 191 | 99.5 |

The laminated articles fabricated from the present thermosetting resins possess remarkable heat resistance as evidenced by the property retention after heat exposures.

The present resins are of especial value when blended with polyhydric diacrylate ester resins of acrylic acids and polyglycidyl bisphenol resins of the general formula

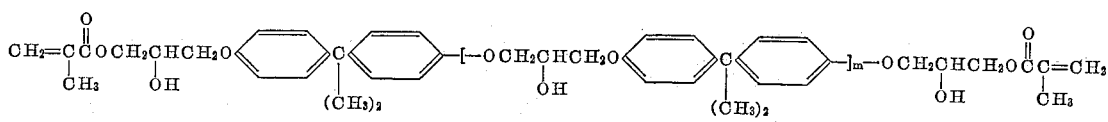

wherein R is a substituent selected from the class consisting of hydrogen and lower alkyl radicals having from one to four carbon atoms and $n$ is an integer from zero to five. Example 8 illustrates these compositions wherein $n$ is zero and R is methyl. Example 9 illustrates these compositions wherein $n$ averages from 2 to 2.5 and R is methyl.

*Example 8.*—A thermosetting resinous composition was prepared from forty parts by weight of the resin of Example 2 and sixty parts by weight of the reaction product of two mols methacrylic acid and one mol diglycidyl ether of Bisphenol-A, having the formula:

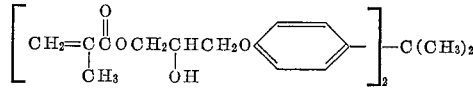

The mixture was dissolved in 20 percent by weight of styrene. Clear casting from the mixture were obtained with tert-butyl perbenzoate as an initiator. The castings had a flexural strength of 18,400 p.s.i. and a flexural modulus of $0.500 \times 10^6$.

*Example 9.*—A thermosetting resinous composition was prepared from forty parts by weight of the resin of Example 2 and sixty parts by weight of the reaction product of two mols methacrylic acid and two equivalents of an epoxy resin sold by Shell Chemical Company under the tradename EPON 1001, having an epoxide equivalent of about 450–525 and a formula wherein $m$ ranges from about 1 to 4 and averages from about 2 to 2.5. The two mixed resins were dissolved in 30 percent by weight styrene as a copolymerizable diluent. The resinous mixture readily copolymerized to give clear castings having a flexural strength of 15,750 p.s.i. and a flexural modulus of $0.475 \times 10^6$.

*Solvent resistance*

The present resins possess remarkable resistance to deterioration from certain solvents and chemical reagents. Castings of the resin of Example 2 (diluted with 25 percent styrene and with 30 percent styrene were exposed to boiling solvents for two weeks to determine strength retentions. The resins of Examples 8 and 9 were similarly exposed. Flexural strength after exposure is reported:

| Solvent | Resin of Example 2 | | Resin of Example 8 | Resin of Example 9 |
| --- | --- | --- | --- | --- |
| | In 25% styrene | In 30% styrene | | |
| None | 18,775 | 17,900 | 18,400 | 15,750 |
| ASTM Oil #1, 194° C | 18,920 | 17,675 | 16,605 | 18,650 |
| ASTM Oil #2, 122° C | 12,850 | 18,250 | 18,500 | 12,775 |
| Turbo fuel #4, 112.5° C | 17,720 | 16,075 | 20,525 | 22,900 |
| n-Heptane, 98.5° C | 18,700 | 23,000 | 18,274 | 20,300 |
| JP-4 fuel, 124° C | 14,565 | 17,215 | 18,650 | 14,565 |

The remarkable retention of flexural strength properties after immersion for two weeks in these boiling solvents indicates the unusual heat resistance of the materials.

*Heat distortion temperatures*

The present resin compositions possess unusually high heat distortion temperatures. The resin of Example 4, when cast, has an initial heat distortion temperature of about 240° C. If the resin is post-cured, for example, by exposure at 200° C. for three hundred hours, the heat distortion temperature rises to above 300° C. Continued post curing at higher temperatures has developed heat distortion temperatures of 380° C. The heat distortion temperature appears to continue increasing with added curing.

The present resins may be combined in polymerizable thermosetting resinous mixtures with alpha-beta ethylenically unsaturated polyester resins which comprise the reaction products of dicarboxylic acids (or anhydrides thereof) with glycols. Not all of the dicarboxylic acid must be ethylenically unsaturated. It is possible for a blend of maleic acid (which is ethylenically unsaturated) and phthalic acid (which is not ethylenically unsaturated) to be combined into a hybrid polyester resin by reaction with a glycol. The resulting polyester resin will possess some ethylenic unsaturation and hence will be considered to be an ethylenically unsaturated polyester resin.

Mixtures of the present thermosetting polymerizable resins with ethylenically unsaturated polyester resins are of great interest in filament winding coatings and also in the fabrication of laminated articles with reinforcing fibers such as glass fibers and glass fabrics. It has been found

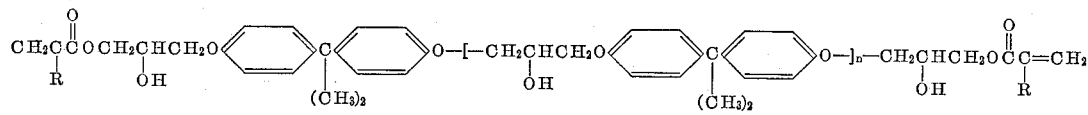

that a small quantity of the present resins in the conventional unsaturated polyester resin formulation will greatly improve certain properties of the resulting laminate, e.g., the heat distortion, the strength, the solvent resistance, et cetera.

We claim:
1. A polymerizable resinous substance having the formula

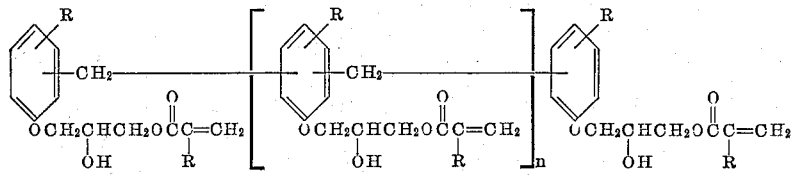

wherein R is a substituent selected from the class consisting of hydrogen and lower alkyl radicals having from one to four carbon atoms and $n$ is an integer from zero to five.

2. An ethylenically unsaturated polymerizable resinous mixture comprising
   (A) a polyhydroxy diacrylate ester resin having the formula

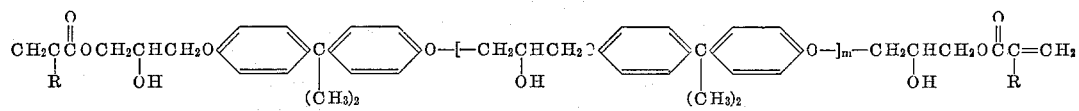

wherein R is a substituent selected from the class consisting of hydrogen and lower alkyl radicals having from one to four carbon atoms and $m$ is an integer from zero to five; and
   (B) a polyhydroxy polyacrylate ester resin having the formula

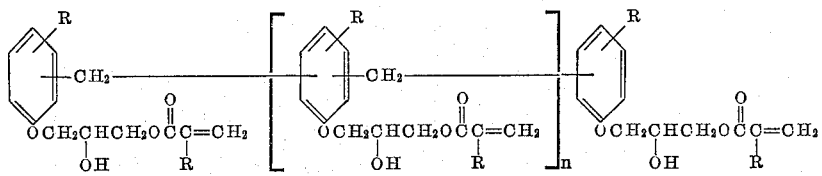

wherein R is a substituent selected from the class consisting of hydrogen and lower alkyl radicals having from one to four carbon atoms and wherein $n$ is an integer from zero to five.

3. A polymerizable resinous composition comprising the polymerizable resinous substance of claim 1 in admixture with polymerizable ethylenically unsaturated monomers selected from the class consisting of styrene, vinyl toluene, divinyl benzene, diallyl phthalate, methyl methacrylate, triallyl cyanurate, ethylene-glycol-dimethacrylate and trimethylolpropanetrimethacrylate.

4. A polymerizable resinous composition comprising the polymerizable resinous substance of claim 2 in admixture with an ethylenically unsaturated monomeric diluent copolymerizable therewith and selected from the class consisting of styrene, vinyl toluene, divinyl benzene, diallyl phthalate, methyl methacrylate, triallyl cyanurate, ethylene-glycol-dimethacrylate and trimethylolpropanetrimethacrylate.

5. The method for preparing a polymerizable, thermosetting polyhydroxy polyacrylate ester comprising stirring together in a reaction zone and heating to a reaction temperature between room temperature and about 150° C. a reaction mixture including (A) at least one mol of an acrylic acid having the formula

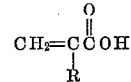

wherein R is a substituent selected from the class consisting of hydrogen and lower alkyl radicals having from one to four carbon atoms;
   (B) one epoxy equivalent of an epoxidized phenol-formaldehyde novolac resin derived from the epoxidation of a phenol-formaldehyde novolac resin having a molecular weight from about 200 to about 1200; and

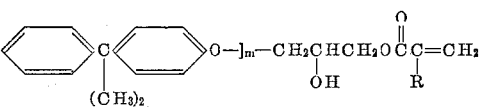

(C) as a reaction catalyst, a mixture of triphenyl stibine and triphenyl phosphine in an amount from 0.1 to 2.0 percent by weight of the reaction mixture, the amount of triphenyl stibine being 0.1 to 10 times the amount of triphenyl phosphine;

maintaining the reaction mixture at the reaction temperature until the acid value of the mixture diminishes to a sufficient level to indicate substantial elimination of all the epoxide groups from the reaction mixture, and recovering the polymerizable, thermosetting polyhydroxy polyacrylate ester from the reaction zone.

6. The method of claim 5 wherein the said reaction mixture includes an inert solvent for the product polyhydroxy, polyacrylate ester.

7. The method of claim 5 wherein the said reaction mixture includes as a solvent an ethylenically unsaturated copolymerizable monomer which is non-reactive under the reaction conditions, said solvent being selected from the class consisting of diallyl phthalate, ethylene-glycol dimethacrylate and trimethylolpropane-trimethacrylate.

8. A coated filament for use in filament winding comprising glass fibers coated with a polymerizable, thermosetting resinous composition of claim 4.

9. A copolymer of a resinous substance having the formula

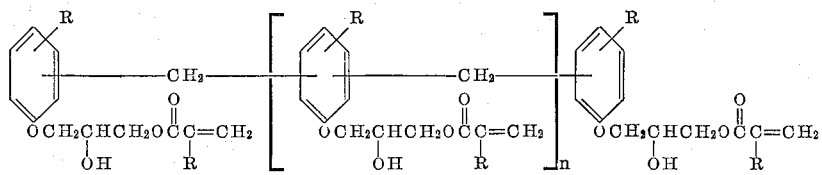

wherein R is a substituent selected from the class consisting of hydrogen and lower alkyl radicals having from one to four carbon atoms and wherein $n$ is an integer from zero to five; and an ethylenically unsaturated polymerizable monomer selected from the class consising of styrene, vinyl toluene, divinyl benzene, diallyl phthalate, triallyl cyanurate, ethylene-glycol dimethacrylate and trimethylolpropane trimethacrylate.

10. A thermoset copolymer comprising the polymerization product of the resinous mixture of claim 2.

11. A thermoset copolymer comprising the polymerization product of the resinous mixture of claim 3.

12. A thermoset copolymer comprising the polymerization product of the resinous mixture of claim 4.

13. A thermoset copolymer comprising the polymerization product of (A) the resinous substance of claim 1 and (B) an ethylenically unsaturated polyester resin formed by condensation of an ethylenically unsaturated dicarboxylic acid and a glycol.

14. A polymerizable thermosetting resinous mixture comprising (A) the polymerizable resinous substance of claim 1 in admixture with (B) an alpha-beta ethylenically unsaturated polyester resin comprising the esterification product of a dicarboxylic acid and a glycol wherein at least a portion of the said dicarboxylic acid contains alpha-beta ethylenic unsaturation.

15. A fibrous laminated article containing glass fibers and the polymerizable resinous mixture of claim 14 cured to a thermoset condition.

References Cited by the Examiner

UNITED STATES PATENTS

| | | | |
|---|---|---|---|
| 2,824,851 | 2/1958 | Hall | 260—837 |
| 2,826,562 | 3/1958 | Shokol | 260—831 |
| 2,846,410 | 8/1958 | Armitage et al. | 260—837 |
| 3,156,740 | 11/1964 | Bussell | 260—836 |

MURRAY TILLMAN, *Primary Examiner.*

J. C. BLEUTGE, *Assistant Examiner.*